United States Patent [19]

Jacobs

[11] Patent Number: 4,826,189
[45] Date of Patent: May 2, 1989

[54] DOUBLE WISHBONE SYSTEM

[76] Inventor: Russell Jacobs, 890 F. St., Independence, Oreg. 97351

[21] Appl. No.: 218,454

[22] Filed: Jul. 11, 1988

Related U.S. Application Data

[63] Continuation of Ser. No. 870,884, Jun. 5, 1986, abandoned.

[51] Int. Cl.$^4$ .............................................. B60G 21/00
[52] U.S. Cl. .................................. 280/111; 280/725; 280/112.1
[58] Field of Search ................. 280/111, 112 R, 724, 280/725

[56] References Cited

U.S. PATENT DOCUMENTS

| | | | |
|---|---|---|---|
| 2,536,337 | 1/1951 | Whitlow | 280/111 |
| 3,773,348 | 11/1973 | Davis | 280/112 R |
| 4,053,171 | 10/1977 | Hyler | 280/112 R |
| 4,248,455 | 2/1981 | Manning | 280/112 R |

Primary Examiner—Charles A. Marmor
Assistant Examiner—Donn McGiehan
Attorney, Agent, or Firm—Charles N. Hilke

[57] ABSTRACT

A novel wishbone system attaches single or dual axles of wheeled vehicles to a vehicle frame where such system can be used for driving or following axles and steering or non-steering axles. A solid wishbone is attached to the axle and is further attached to the vehicle frame by a fixed ball and socket arrangement. Furthermore, a telescoping wishbone ball and socket are attached to the vehicle frame by a telescoping wishbone pivot pivotably mounted to the telescoping wishbone casing. One end of the telescoping wishbone shaft moves within the telescoping wishbone casing and the other end of the telescoping wishbone shaft contains the telescoping wishbone socket. The telescoping wishbone ball is fixably attached to the solid wishbone near the axle or directly to the axle. The basic system includes upper and lower suspension supports between which are placed airbags or coil springs. The airbags are placed at the outer extremity of each suspension support. In the steering following axle mode, a turntable is used to rotate the following axles by means of a steering assembly. Furthermore, in single tire arrangements a steering mechanism steers the individual tires. In steering drive axles, the telescoping wishbone and solid wishbone are modified to provide an unobstructed path for the drive lines.

1 Claim, 4 Drawing Sheets

DOUBLE WISHBONE SYSTEM

This is a continuation of co-pending application Ser. No. 870,884 filed on June 5, 1986, and now abandoned.

BACKGROUND OF THE INVENTION

1. Field of Invention.

This invention is in the general area of wheeled vehicles. In particular, the axle-frame alignment system, suspension system, steering system and steering drive axle are involved in the invention.

2. Background of the invention.

Wide stance suspension systems have been previously known, Daimler Benz, French Pat. No. 997.430. In previous systems, scuffing of tires in turns could not be prevented. In addition, the axles would "walk", a converse fore and aft motion, and have other motions which were uncontrolled. This invention overcomes that problem by the use of the double wishbone.

In normal suspension systems, torque arms, stabilizer bars, and/or spring shackles restrain the axle in its correct transverse alignment to the frame. If any vertical motion of the vehicle is not simultaneous at both ends of an axle, the restraining parts pull the axle out of alignment with the frame and cause a change in the direction of travel, called "wander", which is corrected by turning the steering wheels. All the foregoing components, by necessity, have joints under severe tension, and are thus prone to wear and failure.

This invention separates the suspension system from the axle-frame alignment system to ensure that both systems are more effective.

The telescoping wishbone of my invention maintains the transverse center of the axle directly on the vertical centerline of the vehicle at all times while the sold wishbone prevents forward and backward motion at the ends of the axle, keeping the whole in exact alignment with the frame. With all axles of a vehicle having their respective balls and sockets at the same vertical height from ground level, tension and wear on all alignment components are reduced. Stress is also reduced because the alignment components bear none of the weight of the vehicle and the suspension components bear none of the torsion. Furthermore, drag or road friction caused by misaligned axles, particularly misaligned dual axles, is reduced because each axle is aligned with the frame.

Wide stance suspension similar to the Daimler-Benz patent lends greater stability to a vehicle while providing for a softer ride because it eliminates the fulcrum point on the axles inboard of the tires. With normal suspension systems, springs, pads, or air bags are mounted between the frame and axles inboard of the wheels which constitutes fulcrum points over which the weight of the vehicle pivots. For every action there is an equal and opposite reaction, therefore, for every motion at the end of an axle, the opposite end reacts negatively, contributing to each bounce communicated to the frame. Also, the overhang on each side from the spring to the side of the vehicle carries weight that contributes to the undesirable tendency for the vehicle to pivot on its spring and roll over. This tendency is increased when the vehicle is already leaning, as in turns, because the overall center of gravity of the vehicle is considerably higher than the axle and it shifts from side to side depending upon the lean of the vehicle. With air bags or springs located at a vehicle's extreme width, these tendencies are overcome.

When vehicles with dual drive axles turn, the tires not on the exact turning radius are forced to slide which causes tire wear and breaks road surface contact or traction. The greater distance conventional dual drive axles are separated, the greater the disadvantages of tire wear and loss of traction. Under this system, all tires have the same turning radius, hence low wear and greater traction. Also, with the same radius for both front and rear drive axles, there is less strain on the inter-axle differential, which is the device that compensates for the axles travelling at different speeds as would be necessary if they had different turning radii or different size tires.

If the longitudinal center of balance of the load is near the center of the dual drive rear axles, a bucking motion can occur. With each bounce on rough roads, the center of balance moves back and then forward and, once begun, seems to perpetuate like a pendulum. To overcome this problem, it is desirable to separate the dual drive axles as far apart as is practical to better distribute the load for the same reason as placing the suspension parts at the extreme width of the vehicle for stability. With this invention drive axles can be separated much further apart.

Steering drive axles in use today transmit power through the steering knuckle by means of the conventional universal joint. Such joint has vibration at all angles of turning except a very small range. The parts of the universal joint are small because they must fit within the confines of the steering knuckle unit which likewise must fit within the wheel itself. This invention replaces the universal joint with a power pivot that will run smoothly with no vibration and has fewer and larger parts for more strength.

With the advent of longer-wider trailers, some highways and urban streets are too crooked or intersections too narrow for these trailers to negotiate. Normal trailers steer towards the hitch on the forward vehicle. Therefore, they cut toward the inside of every turn in direct relation to the length from the hitch to the rear wheels.

This invention's steering trailer steers toward the outside of the turn in an amount determined by the angle of the forward vehicle in relation to the trailer. An advantage of this system is that, except for the requirements of a notch cut in the side of a conventional tractor fifth wheel, all the parts of this system are permanently attached to the trailer and can be locked in straight-ahead position if steering is not required or a conventional tractor fifth wheel is used.

SUMMARY OF INVENTION

A novel wishbone system attaches single or dual axles of wheeled vehicles to a vehicle frame where such system can be used for driving or following axles and steering or non-steering axles. A solid wishbone is attached to the axle and is further attached to the vehicle frame by a fixed ball and socket arrangement. Furthermore, a telescoping wishbone ball and socket are attached to the vehicle frame by a telescoping wishbone pivot pivotably mounted to the telescoping wishbone casing. One end of the telescoping wishbone shaft moves within the telescoping wishbone casing and the other end of the telescoping wishbone shaft contains the telescoping wishbone socket. The telescoping wishbone ball is fixably attached to the solid wishbone near the axle or directly to the axle. The basic system includes upper and lower suspension supports between which are placed airbags or coil springs. The airbags are placed at the outer extremity of each suspension support. In the steering following axle mode, a turntable is used to rotate the following axles by means of a steering assembly. Furthermore, in single tire arrangements a steering mechanism steers the individual tires. In steering drive axles, the telescoping wishbone and solid wishbone are modified to provide an unobstructed path for the drive lines.

It is an object of this device to provide a steerable drive axle system.

It is an object of this system to provide a steerable following axle system.

It is an object of this system to use single tires in steerable drive axle systems.

It is an object of this system to reduce tire wear.

It is an object of this system to separate the axle-frame alignment system from the suspension system.

It is an object of this system to improve stability.

It is an object of this system to reduce vibrations by replacing the universal joint with a power pivot in steerable drive axles.

It is an object of this system to prevent wandering i.e., misaligned wheels which steer themselves.

It is an object of this system to provide rotatable wishbone connections level with the axle.

It is an object of this system to provide a reduced turning radius.

It is an object of this system to increase separation of dual drive axles.

It is an object of this system to provide a smoother ride.

It is an object of this system to minimize weight increase of this system.

It is a final object of this system to evenly distribute driving power.

DESCRIPTION OF THE PREFERRED EMBODIMENTS

Figure 1:
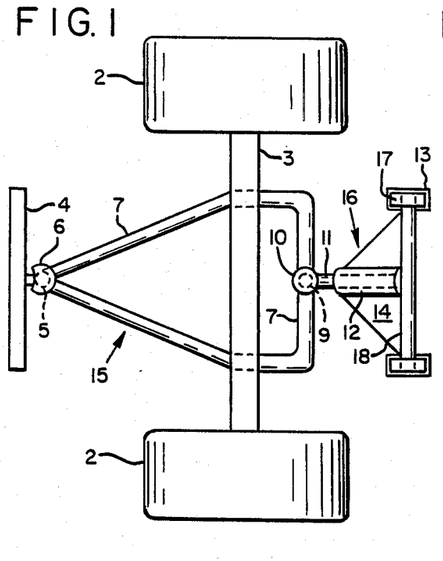
FIG. 1 is a top view of a double wishbone system.

In FIG. 1 we began showing how the total system is put together. The axle-frame alignment system starts with a solid wishbone 15 and a telescoping wishbone 16. The solid wishbone 15 is made up of a solid wishbone triangle 7, which is connected to a solid wishbone socket 6. The solid wishbone triangle 7 is connected to the axle 3. The solid wishbone 15 is connected to the frame attachment 4 by means of a solid wishbone ball 5. The solid wishbone socket 6 fits over the solid wishbone ball 5 as is standard. On the solid wishbone triangle 7 is a telescoping wishbone ball 9. The telescoping wishbone 16 is made up of bushings 17 on a telescoping wishbone pivot shaft 18 which is attached to the frame 1 by means of the U-clamp 13. Angle casing brace 14 reinforces telescoping wishbone casing 12 into which is slidably mounted one end of a telescoping wishbone shaft 11 which, at the other end, is attached by means of the telescoping wishbone socket 10 to the telescoping wishbone ball 9.

Figure 2:
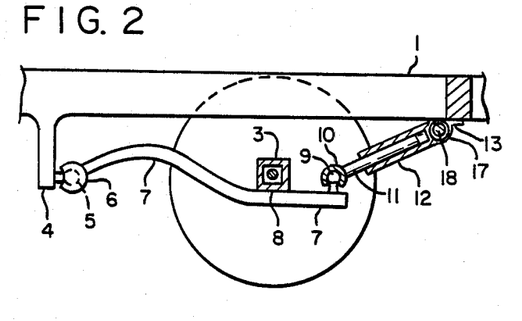
FIG. 2 is a side view of the double wishbone system.

FIG. 2 shows additional features of this portion of the system. The frame attachment 4 is connected to the frame 1. Additionally, wishbone axle attachment 8 connects the solid wishbone triangle 7 to the axle 3. The telescoping wishbone pivot shaft 18 is attached to the bottom of frame 1. Note that bushings 17 fit within the U-clamp 13 and around pivot shaft 18. The single wheel 2 is connected to the axle 3.

Figure 3:
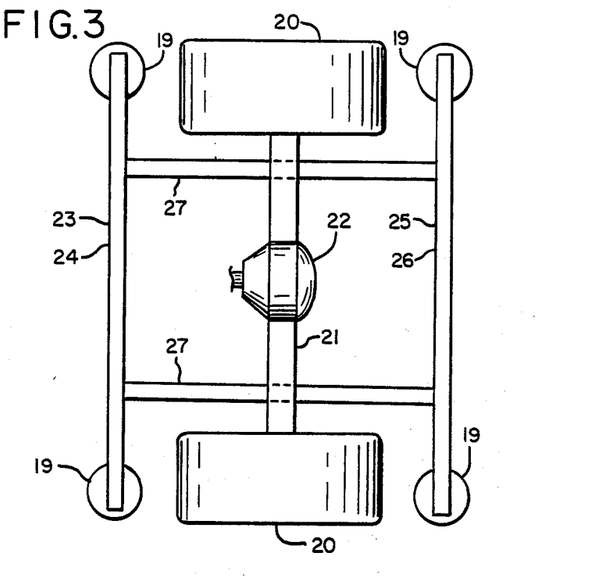
FIG. 3 is a top view of the drive wheel suspension system.

The second portion of the total system comprises the suspension system. FIG. 3 shows single drive wheel 20 attached to single drive axle 21 which is connected to a differential 22 in the standard manner. While various damping means are available, airbags will be used to illustrate the invention. Four airbags 19 are held in place by an upper forward support 23 and lower forward support 24, and an upper rear supports 25 and a lower rear support 26. The airbags 19 are located at the extreme width of the vehicle. Two axle supports 27 are shown.

Figure 4:
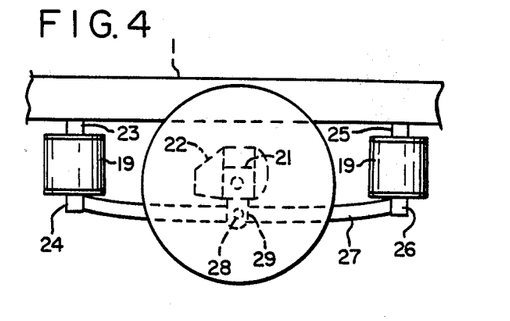
FIG. 4 is a side view of the drive wheel suspension system.

FIG. 4 shows additional features of the suspension system. The axle support 27 is connected to the lower forward support 24 and the lower rear support 26. In addition, the axle support 27 is connected by means of the axle support pivot 28 and the axle support attachment 29 to the single drive axle 21. The placement of the airbags 19 is shown.

Figure 5:
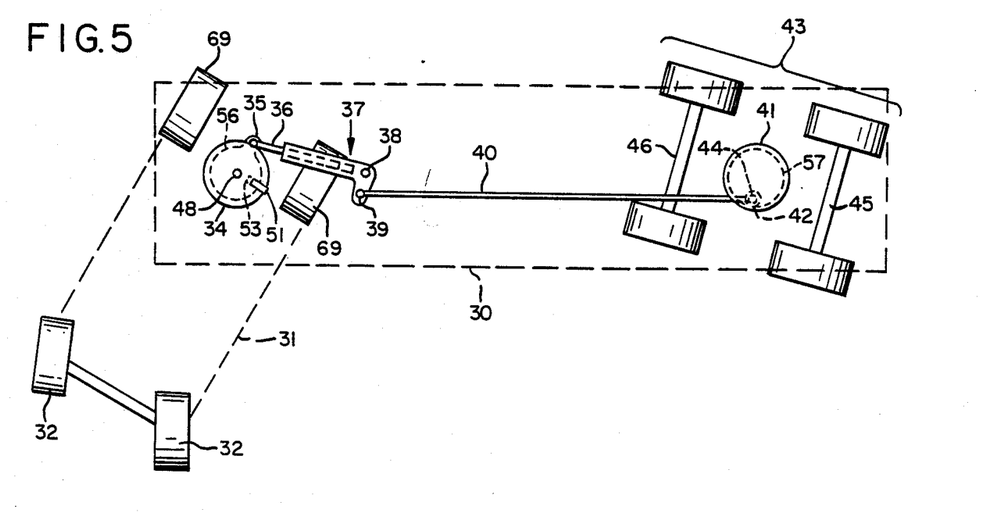
FIG. 5 is a top view of a dual axle trailer steering system.

FIG. 5 shows a single drive axle truck with a dual axle trailer which is steerable. The dual axle trailer 30 is connected to the truck 31 by a novel steering system. The truck's steering tires 32 and the truck single drive tires 69 are shown. The trailer turntable 34 is directly attached to the dual axle trailer trailer 30 and the trailer king pin 48. A slide trailer turntable attachment 35 is solidly attached to the slideable turntable 56 (see FIGS. 6 and 7). The trailer turntable shaft 36 is pivotably attached to the slide trailer turntable attachment 35 and is slidably attached to the steering cylinder 37. The steering cylinder 37 is pivotably attached to the trailer 30 by means of the steering pivot 38. The steering shaft 40 is pivotably attached to the steering cylinder 37 by the steering cylinder pivot 39 at one end and is attached at the other end to the inner turntable 57. The inner turntable 57 is rotatable within the dual steering following turntable 41, which is solidly attached to the trailer 30. The trailer turntable pivot 44 accomplishes the connection between the trailer turntable attachment 42 and the steering shaft 40. The dual steering following axles 43 are comprised of a following rear axle 45 and a following forward axle 46.

Figure 6:
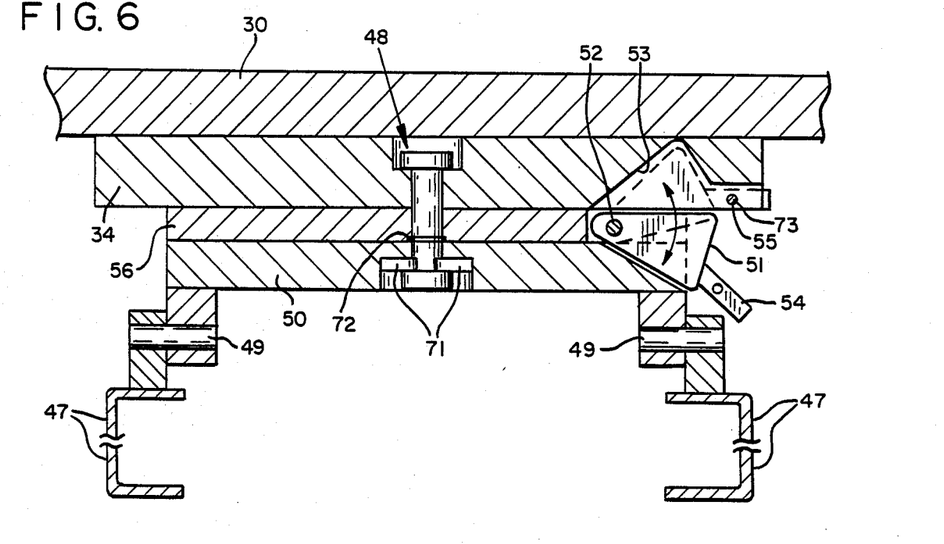
FIG. 6 is a front cross section view of the turntable of the dual axle steering trailer.

In FIG. 6 a front view of the trailer-truck attachment is shown. The king pin 48 is firmly attached to the dual axle trailer 30. The trailer turntable 34 is positioned around the king pin 48 and attached to the dual axle trailer 30. On the truck frame 47, by means frame pivot 49, the standard fifth wheel 50 is attached. Under the trailer turntable 34, and positioned around the trailer king pin 48, is the slidable turntable 56 with a snap ring 72. Within the fifth wheel 50 are contain the standard dogs 71. The king pin 48 slides past the dogs 71 into the fifth wheel 50 in the standard fashion. A turntable lock 51 is pivotably mounted through the turntable lock pivot 52 to the slidable turntable 56. Within the trailer turntable 34, is a trailer turntable notch 53 into which the turntable lock 51 can pivot. A position hole 54 matches the turntable position hole 55 in order to lock the slidable turntable 56 to the trailer tutntable 34 by means of a lock pin 73.

Figure 7:
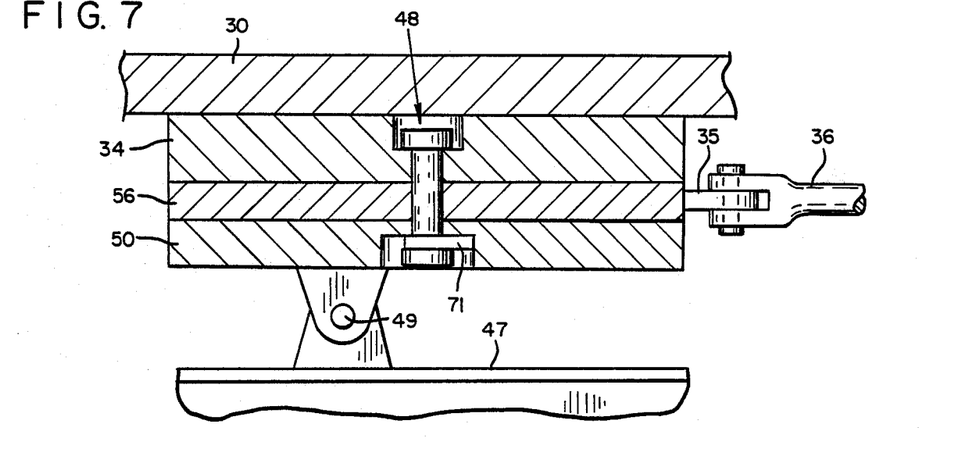
FIG. 7 is a side view of the turntable and a dual axle steering system.

In FIG. 7 a side view of the trailer-truck attachment is shown. The slide trailer turntable attachment 35 is fixably attached to the slidable turntable 56. The trailer turntable shaft 36 is pivotably mounted to the slide trailer turntable attachment 35.

Figure 8:
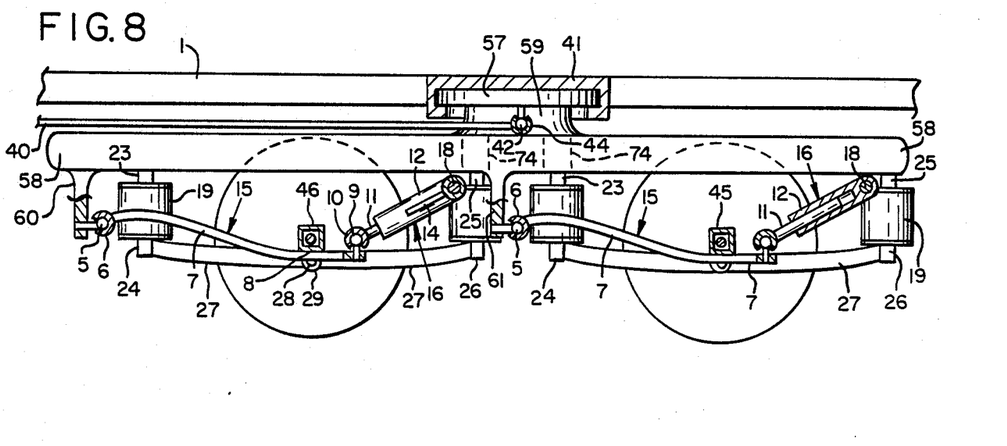
FIG. 8 is a side view of the dual axle turntable system with double wishbone and suspension.
Figure 9:
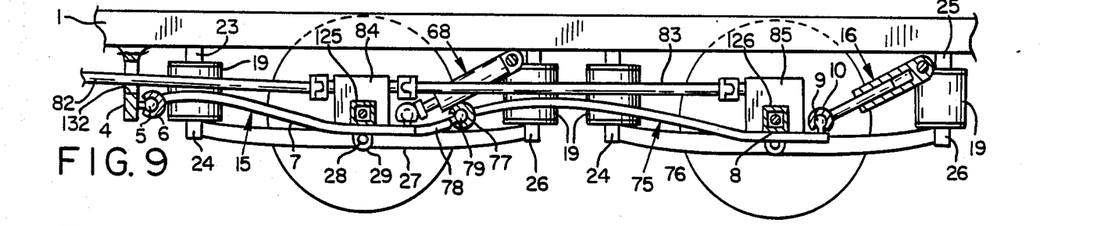
FIG. 9 is a side view of the dual axle drive system with double wishbone and suspension.
Figure 10:
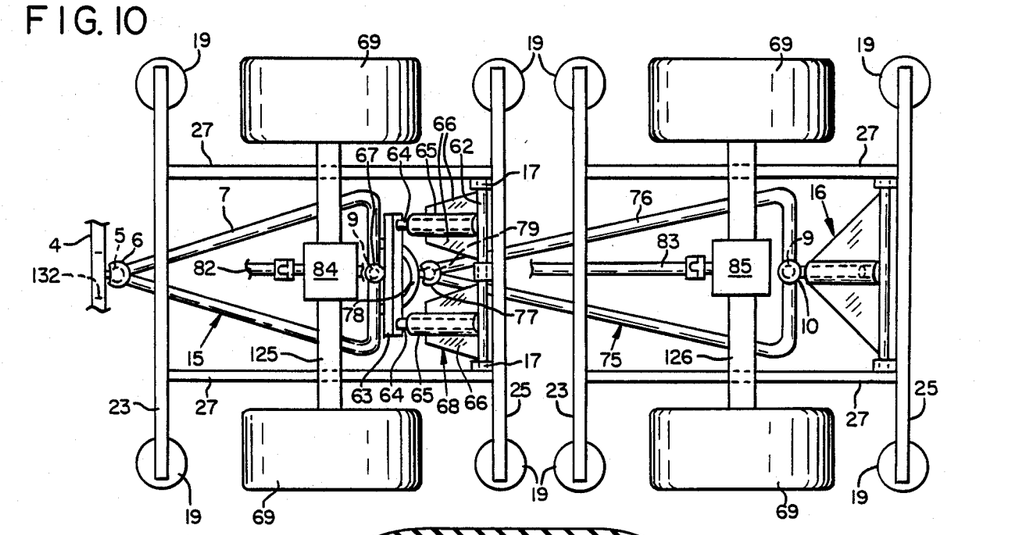
FIG. 10 is a top view of the dual axle drive system with double wishbone and suspension.

FIG. 8 is a detailed side view of the dual steering following axles 43. Within the dual steering following turntable 41 is an inner turntable 57 which is mounted by means of inner turntable attachment 59 to the turntable frame 58 by the turntable cross members 74. The steering shaft 40 is shown connected to the trailer turntable attachment 42 by means of trailer turntable pivot 44. The turntable attachment 42 is fixably connected to the inner turntable 57. A forward frame attachment 60 and a rear frame attachment 61 are fixably connected to the turntable frame 58. The suspension system as described in FIGS. 3 and 4 is the same basic suspension system as is shown in FIGS. 8, 9, and 10. However, in FIG. 8, the upper forward support 23 and the upper rear support 25 are attached to the turntable frame 58 rather than the frame 1. But in all other respects, the suspension system is the same as FIGS. 3 and 4. The double wishbone system for the following forward axle 46 and the following rear axle 45 are as pictured in FIGS. 1 and 2. However, in this instance, solid wishbone balls 5 are attached to the forward frame attachment 60 and the rear frame attachment 61 rather than to the frame attachment 4. Similarly, the telescoping wishbone pivot shaft 18 is attached to the turntable frame 58 rather than the frame 1.

FIG. 9 is a side view of the dual axle drive system with double wishbone and suspension. Because of the first drive line 82 and the second drive line 83, it is necessary to modify the configurations of the solid wishbone and the telescoping wishbone. The suspension system in this figure is exactly the same as that shown in FIGS. 3 and 4. The frame attachment 4 has a hole 132 through it so that the first drive line 82 can pass to the first differential 84. The split drive telescoping wishbone 68 is a modification of the telescoping wishbone 16. However, this modification will be described in the discussion of FIG. 10, which provides a clear view of the modification. A ball extension bar 78 is attached to the solid wishbone triangle 7 in order to hold the extension ball 79. The extension ball 79 is held in a position the same height above the ground as are the axles and other balls. The dual drive solid wishbone 75 contains a dual drive solid wishbone triangle 76 which is merely an extension of solid wishbone triangle 7 in order to position the dual drive solid wishbone socket on the extension ball 79. The second drive line 83 passes from the first differential 84 to the second differential 85 and passes through the solid wishbone triangle 76.

In FIG. 10, a top view of the dual axle drive system with double wishbone and suspension is shown. Here we can clearly see the modification to the telescoping wishbone 16. The drive wishbone pivot 62 is attached to the frame 1. A wishbone bar 63 which is attached to the dual socket 67 which fits over the telescoping wishbone ball 9 and which is attached to the dual shafts 64. The dual shaft 64 slide within the dual shaft casing 65, which is held to the dual wishbone pivot 62 by the dual bracing 66. Thus, the second drive line 83 passes above the wishbone bar 63, between the dual shaft 64, and under the dual bracing 66. Note also that second drive line 83 besides passing through split drive telescoping wishbone 68 also passes through the dual drive solid wihbone 75 in order to reach the second differential 85.

Figure 11:
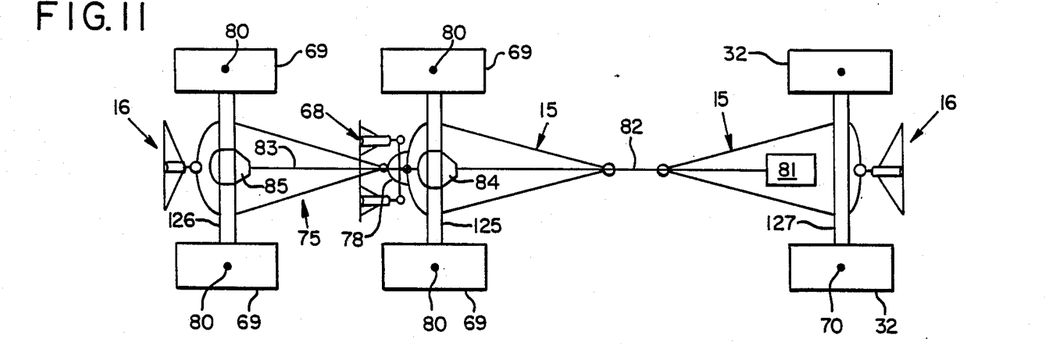
FIG. 11 is a top view showing the double wishbone system.

FIG. 11 shows a truck where all wheels are steerable including the drive wheels. FIG. 11 shows the king pin 70 within the steering tires 32 and the drive dual king pin 80 within the single drive tires 69. In addition, a motor 81 is shown with a first drive line 82 which leads to the first differential 84 and a second drive line 83 which leads from the first differential 84 (which includes the inter-axle differential) to the second differential 85. The solid wishbone 15 and telescoping wishbone 16 are shown attached to the front steering axle. Note that this arrangement is the reverse of the arrangement shown in FIG. 1. In other words, the double wishbone system does not require a specific order of the solid wishbone 15 and the telescoping wishbone 16. On the forward drive axle 125 a solid wishbone 15 is provided with a modification and the split drive telescoping wishbone 68 is a different version of the telescoping wishbone 16. On the rear drive axle 126 a dual-drive solid wishbone 75 is provided which is a modification of the solid wishbone 15. The standard telescoping wishbone 16 is used. Now referring back to FIGS. 9 and 10, the modification is shown. Dual socket 67 is attached to the standard telescoping wishbone ball 9. The wishbone bar 63 attaches to the dual socket 67 and is fixably attached to the dual shafts 64 which are within the dual shaft casings 65. Dual bracing 66 is used in the attachment to the drive wishbone pivot 62. This modification constitutes the split drive telescoping wishbone 68. The dual drive solid wishbone 75 has the following modifications Dual drive solid wishbone bar 76 replaces the solid wishbone triangle 7. The dual-drive solid wishbone socket 77 fits over the extension ball 79 which is mounted on the ball extension bar 78 which is attached to the rear portion of the solid wishbone bar 7 on forward drive axle 125. These two modifications allow a drive shaft to pass from the first differential 84 to the second differential 85 without obstructions as shown in FIG. 10.

Figure 12:
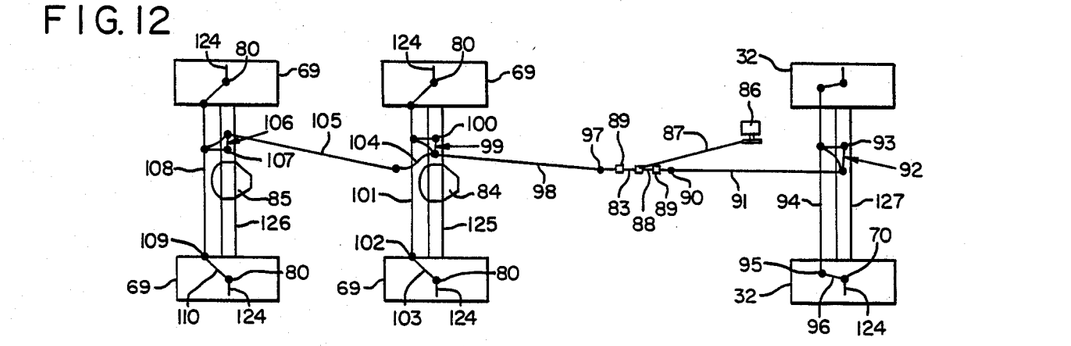
FIG. 12 is a top view of the steering linkages.

Turning now to FIG. 12, the steering system is shown. A steering gear 86 moves a drag link 87 which is fixably attached to the transfer shaft 88 mounted slidably within bushings 89. The forward connection 90 attaches the transfer shaft 88 to the forward steering rod 91 which is pivotably attached to the forward steering quadrant 92. The forward steering quadrant 92 is pivotably attached by the forward quadrant pivot 93 to the front steering axle 127. The forward steering quadrant 92 is also pivotably attached to the forward tie rod 94 which pivotably communicates through the drag pivot 95 to the steering arm 96. The steering arm 96 is solidly connected to the spindle 124 which pivots on king pin 70. The aft steering rod 98 is attached to the transfer shaft 88 by means of the aft connection 97 and is pivotably attached to the forward dual quadrant 99 which is pivotably attached by the forward dual quadrant pivot 100 to the forward drive axle 125. The forward dual quadrant 99 is further pivotably attached to the forward dual tie rod 101 which, by means of forward dual drag pivot 102, is attached to the forward dual steering arm 103. Forward dual steering arm 103 is solidly attached to the spindle 124 and both pivot on dual drive king pin 80. The steering instructions are passed from the forward dual quadrant 99 by means of the dual steering transfer 104 which activates dual steering rod 105. Note that dual steering transfer 104 is fixably attached to aft steering rod 98. The dual steering rod 105 is connected to the aft dual quadrant 106 which is pivotably connected by means of the aft dual quadrant pivot 107 to the rear drive axle 126 as shown. Additionally, the aft dual quadrant 106 is pivotably connected to the aft dual tie rod 108 which is connected by the aft dual drag pivot 109 to the aft dual steering arm 110. Aft dual steering arm 110 is solidly attached to spindle 124 and both pivot on dual drive king pin 80.

Figure 13:
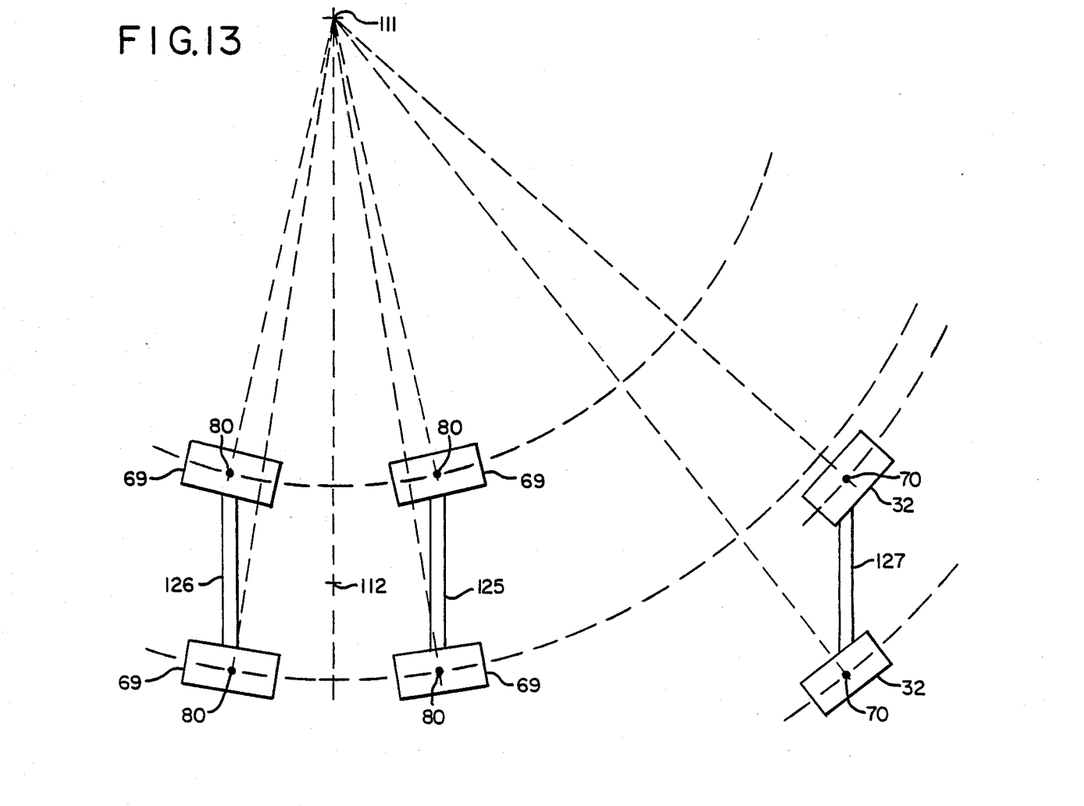
FIG. 13 is a view showing the turning radius.

In FIG. 13, the turning radius is shown where 111 represents the axis of turning radius. 112 represents the center of the dual axles. Note that single tires 32 and 69 are used instead of dual tires throughout this embodiment. Because all drive tires turn on the same radius, the driving power is equally distributed between the two drive axles.

Figure 14:
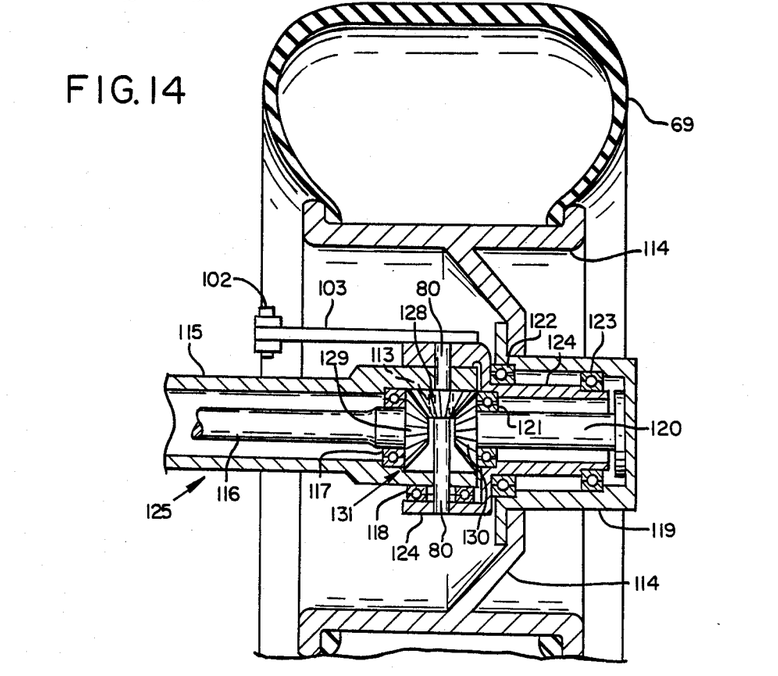
FIG. 14 is a view showing the detail of the single wheel steering system.

Turning now to FIG. 14, a detailed view of the steering of the single tire 69 is shown. The forward dual steering arm 103 is shown solidly attached to the spindle 124. The forward drive axle 125 is cut away to show the axle housing 115 containing the inner axle 116 with an inner axle bearing 117. The thrust bearing 118 is mounted around the dual drive king pin 80 between the axle housing 115 and the spindle 124. Inner axle output gear 129 meshes with the idler gear 128, which in turn transmits the power to the outer axle drive gear 130. Idler gear 128 moves freely around the dual drive king pin 80 by means of idler gear bearings 113. The hub 119 is fixably attached to the outer axle 120. The outer axle bearing 121 is shown. Similarly, the inner wheel bearing 122 and the outer wheel bearing 123 are shown in the diagram. Finally, the tire rim 114 mounted to the hub 119 is shown. The power pivot 131 comprises the inner axle output gear 129, the idler gear 128, the outer axle drive gear 130, and the dual drive king pin 80.

In operation, various portions of the total system must be described. First, is the double wishbone system, also called the axle-frame alignment system, which aligns the axle and frame; second, is the wide stance suspension system; third, is the steering means for a dual axle trailer; and fourth, is the power pivot steering mechanism for drive axles.

Referring now to FIGS. 1 and 2, we see the novel double wishbone system, which maintains exact axle-frame alignment. The design objectives are to prevent the wheels 2 from moving fore and aft or side to side in relation to the frame. In addition, the axle must be allowed to move up and down and the wheel and axle combination must allow for one wheel 2 to be higher than another wheel 2, for example when going over bumps or into potholes in the road. The wheels 2 must stay in fixed alignment with one another, i.e., no converse fore and aft motion, because of the attachment of the solid wishbone bar 7 to the single following axle 3 by means of the wishbone axle attachment 8. Note that the solid wishbone 15 would allow side to side motion about the solid wishbone ball 5 and solid wishbone socket 6. This is prevented by telescoping wishbone 16 which is fixably attached to the frame and thus prevents side to side movement allowed by solid wishbone 15. If wheels 2 go over, for example, a curb, the axle 3 rises vertically causing the solid wishbone 15 to rise vertically pivoting about the solid wishbone ball 5. In addition, the telescoping wishbone shaft 11 slides further into telescoping wishbone casing 12. The telescoping wishbone shaft 11 rotates about the telescoping wishbone ball 9. Thus, the axle 3 is allowed to rise vertically. Reversing the just described process allows the axle 3 to drop vertically. If one wheel 2 goes over a rock, the solid wishbone 15 will rotate about the solid wishbone ball 5. As before, the telescoping wishbone shaft 11 will rotate about the telescoping wishbone ball 9 while the telescoping wishbone shaft 11 moves slightly further into the telescoping wishbone casing 12. This allows raising one wheel 2 higher than the other wheel 2. The similar process in reverse allows for the lowering of one wheel 2, for example, going through a pothole. Thus axle-frame alignment is maintained when either or both wheels 2 rise or fall. This design prevents both converse fore and aft and side to side movement of the wheels 2 in relation to the frame 1.

Referring now to FIGS. 3 and 4, a wide stance suspension system is provided. While wide stance suspensions have been previously known, the complete separation of the suspension system from the axle-frame alignment system is novel. The upper forward support 23 and the upper rear support 25, each as long as the width of the vehicle, are fixably attached to the frame 1. Four airbags 19 are mounted from the two upper supports 23 and 25 at their extremities near the outside of the single drive wheel 20. The airbags 19 are also attached to the lower forward support 24 and the lower rear support 26. Axle support 27 is pivotably mounted by the axle support pivot 28 to the axle support attachment 29. Note that backward and forward motion and side to side motion between axle support 27 and the frame 1 is not prevented by the suspension system. Those motions are completely prevented by the double wishbone system. The axle support pivot 29 allows for the independent compression of the airbags 19 between forward and rear supports. By mounting the airbags 19 at the extreme width of the vehicle, stability is increased. Furthermore, a valve can be provided to the airbags 19 in order to maintain the height of the frame 1 above the ground when the vehicle is either loaded or empty. In a coil spring suspension system, smaller coil springs with adjustable tension would oppose the main suspension coil springs in order to maintain the height of frame 1. Alternatively, a combination of coil springs and air cylinders could be used.

FIGS. 5, 6, 7, and 8 show the steering means for a dual axle trailer. In operation, it is desireable to be able to turn the dual steering following axles 43 of a trailer in order to reduce the truck-trailer combination turning radius. This is accomplished by means of the fifth wheel 50 fixably attached to slideable turntable 56 by means of turntable lock 51. Concentrating first on the trailer turntable 34, the slideable turntable 56 is free to rotate about the trailer king pin 48 when the turntable lock 51 is pivotably removed from the trailer turntable 34 by loosening the lock pin 73. This allows the slideable turntable 56 to remain locked in position with the fifth wheel 50. The trailer turntable 34 stays in fixed position with the dual axle trailer 30. The trailer turntable shaft 36 pivots by means of the slide trailer turntable attachment 35 which in turns causes the steering cylinder 37 to pivot about the steering pivot 38. This motion is then transmitted to the inner turntable 57 by means of the steering shaft 40. The inner turntable 57 is fixably attached to the turntable frame 58 by means of the turntable cross members 74. This causes the dual steering following axles 43 to turn about the dual steering following turntable 41. Note that the trailer 30 can be made non-steering by simply leaving the lock pin 73 in position.

FIG. 8 shows the combination of the double wishbone system for axle-frame alignment and the suspension system in the steering trailer mode. Note that in this case, the axles are in constant alignment position with the turntable frame 58 rather than the frame 1. Note that when turntable lock 51 is positioned within truck turntable notch 53, the turntable frame 58 lines up exactly with the frame 1. Note that the double wishbone system is exactly the same as shown in FIG. 2 and that the suspension system is exactly as shown in FIG. 4 except that the frame 58 is substituted for the frame 1.

FIGS. 9 and 10 show the dual drive axle system along with the double wishbone system with drive lines and the suspension system. In FIGS. 9 and 10, the first drive line 82 and the second drive line 83 are shown. The split drive telescoping wishbone 68 is necessary in order to allow the second drive line 83 to pass from the first differential 84 to the second differential 85. If the telescoping wishbone 16 were used, the second drive line 83 would hit the telescoping wishbone shaft 11. The split drive telescoping wishbone 68 employs a wishbone bar 63 fixably attached to dual socket 67. Toward each end of wishbone bar 63, dual shafts 64 are fixably attached. Each dual shaft 64 is slidably positioned within a dual shaft casing 65. Dual bracing 66 is shaped around dual shaft casings 65 such that second drive line 83 passes over wishbone bar 63, between dual shafts 64 and under dual bracing 66. The split drive telescoping wishbone 68 is pivotably attached by drive wishbone pivot 62 to the frame 1. Additionally, the dual drive solid wishbone 75 is a necessary modification to accomodate the second drive line 83. A ball extension bar 78 is added as shown in FIGS. 9 and 10 to the solid wishbone triangle 7 of solid wishbone 15 of forward drive axle 125. The extension ball 79, at the same height as forward drive axle 125, is attached to the ball extension bar 78. The dual drive solid wishbone 75 is a modification of solid wishbone 15. Dual drive solid wishbone triangle 76 is extended such that dual drive solid wishbone socket 77 can be attached to extension ball 79. Referring to FIG. 8, rear frame attachment 61 is eliminated. Second drive line 83 now has an unobstructed path from first differential 84 to second differential 85 with these modifications.

FIGS. 11, 12, 13, and 14 show the power pivot steering mechanism for dual drive axles along with the double wishbone system. While a steering system could be developed for dual tires, the invention is presented in single tire format. FIG. 11 is a schematic view of the invention as shown in FIG. 9 and 10. FIG. 12 shows the linkage mechanism from the steering gear 86 to the king pins 70 and dual drive king pins 80 and to spindles 124. Note that the linkage mechanism is designed so that the steering is accomplished near the center of the vehicle in close proximity to the ball and socket arrangements in the double wishbone system. As the steering gear 86 is turned, the transfer shaft 88 is moved backward or forward, which, through the forward steering rod 91, aft steering rod 98 and dual steering rod 105 causes pivoting of the forward steering quadrant 92, forward dual quadrant 99, and aft dual quadrant 106, respectively. The forward tie rod 94, forward dual tie rod 101 and aft dual tie rod 108 transfer the motion to the single wheels by means of steering arm 96, forward dual steering arm 103, and aft dual steering arm 110, respectively, and spindles 124. Note that the steering arms 96, 103 and 110 are solidly connected to the spindles 124 and both pivot on king pins 70 and 80.

In FIG. 13, the axis of turning radius 111 is the center about which the truck turns. The center of dual axles 112 is the point about which the dual axle steer. These points are determined by the geometrical relationships of the steering assembly.

Finally, FIG. 14 shows in detail the power pivot steering mechanism. The inner axle 116 receives power in the standard fashion from the first differential 84. Inner axle bearing 117 allows rotation of the inner axle 116 within the axle housing 115. The inner axle output gear 129 is fixably attached to the inner axle 116, and meshes with idler gear 128 which is allowed to spin freely on dual drive king pin 80 by means of idler gear bearing 113. The idler gear 128 drives the outer axle drive gear 130 causing the outer axle 120 (through outer axle bearing 121) to rotate the fixably attached hub 119. The tire rim 114 is fixably attached to the hub 119, thus rotating the tire 69. The forward dual steering arm 103 is fixably attached to spindle 124 and both pivot on dual drive king pin 80, where thrust bearings 118 are positioned between spindle 124 and axle housing 115 on the lower side to allow for ease of steering. The hub 119 rotates on spindle 124 by means of inner wheel bearing 122 and outer wheel bearing 123. The dual drive king pin 80 is located in the center of tire 69. The power pivot 131 comprises the inner axle output gear 129, the idler gear 128, the outer axle drive gear 130, and dual drive king pin 80 all of which replace the standard universal joint.

From this detailed description of the total system of my invention, it will be understood that I have provided a very unique and novel system. It is to be understood that the form of this invention as shown and described is to be taken as preferred examples of the invention, and that this invention is not limited to the exact arrangement of parts shown in the accompanying drawings or described in the specification. Various changes in the details of construction as to shape, size and arrangement of parts may be resorted to without changing the nature of the invention, the scope of the novel concepts thereof, or the scope of the following claim.

I claim:

1. In a vehicle an alignment system comprising:
   a. a vehicle frame;
   b. at least one wheel;
   c. an axle fixably attached to said wheel;
   d. means for attaching the axle to the vehicle frame such that said axle and said frame are in constant fixed alignment while allowing the axle freedom of vertical movement and freedom of horizontal twisting rotational movement where said means comprises:
   e. a solid wishbone rotatably attached to said frame and fixably attached to said axle;
   f. a telescoping wishbone rotateably attached to said solid wishbone and pivotably attached to said frame where a telescoping wishbone shaft is slideably mounted within a telescoping wishbone casing; and g. where said solid wishbone is rotatably attached to said frame at the same height from the ground as is the axle and where said telescoping wishbone is rotatably attached to said solid wishbone at the same height above the ground as is the axle.

* * * * *